(12) United States Patent
Gomez et al.

(10) Patent No.: US 11,477,088 B2
(45) Date of Patent: *Oct. 18, 2022

(54) SMART POINT OF PRESENCE (SPOP) DEVICES FOR AIRCRAFT-BASED HIGH AVAILABILITY EDGE NETWORK ARCHITECTURE

(71) Applicant: Rockwell Collins, Inc., Cedar Rapids, IA (US)

(72) Inventors: Patrick Gomez, Madison, AL (US); Abdul A. Khan, Richardson, TX (US); Brian S. Rach, Vinton, IA (US); Charles Adams, Marion, IA (US); Mitchell A. Riley, Marion, IA (US); Max G. Taylor, Houston, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/067,500

(22) Filed: Oct. 9, 2020

(65) Prior Publication Data
US 2021/0351988 A1    Nov. 11, 2021

Related U.S. Application Data

(63) Continuation of application No. 17/067,463, filed on Oct. 9, 2020.
(Continued)

(51) Int. Cl.
*H04L 12/28*    (2006.01)
*H04L 41/12*    (2022.01)
(Continued)

(52) U.S. Cl.
CPC ............ *H04L 41/12* (2013.01); *H04L 12/437* (2013.01); *H04L 12/4625* (2013.01); *H04W 84/18* (2013.01); *H04L 2012/4028* (2013.01)

(58) Field of Classification Search
CPC ... H04L 41/12; H04L 12/437; H04L 12/4625; H04L 2012/4028; H04L 45/02; H04L 45/00; H04L 45/04; H04W 84/18
See application file for complete search history.

(56) References Cited

U.S. PATENT DOCUMENTS 7,660,901 B1 *   2/2010   O'Toole, Jr. ........ H04L 41/5054
                                                709/227
8,130,773 B2     3/2012   Hall et al.
                 (Continued)

FOREIGN PATENT DOCUMENTS

CN      109412915 A    3/2019
EP      2629459 A2     8/2013
                (Continued)

OTHER PUBLICATIONS

Alena R L et al: "Communications for Integrated Avionics", Internet Citation, Dec. 27, 2006 (Dec. 27, 2006), XP002451879,Retrieved from the Internet: URL:http://ic.arc.nasa.gov/publications/pd f/1277.pdf, [retrieved on Jan. 1, 2007], p. 2-p. 5, p. 8-p. 11.
(Continued)

*Primary Examiner* — Phuongchau Ba Nguyen
(74) *Attorney, Agent, or Firm* — Suiter Swantz pc llo (57) ABSTRACT

A smart network access point (SNAP) device is disclosed. In embodiments, the SNAP device includes trunk ports for accepting a network trunk cable (e.g., fiber optic trunk) and thereby connecting the SNAP device to an aircraft-based network of SNAP devices. The SNAP device includes switch ports for incorporating physical connections to mission systems (MS) or air vehicle systems (AVS) components and devices, providing a local smart point of presence (SPoP) throughout a physical subdivision (e.g., network district) of an aircraft. The SNAP device is configured for monitoring data exchanges between local MS/AVS components and the aircraft network. The SNAP device includes a
(Continued)

cybersecurity module for connecting to local security components (e.g., data guards and multiple levels of security (MLS) encryption/decryption) or for providing built-in data guard and encryption/decryption services. The SNAP device includes power control components for managing power distribution to the connected local network components.

7 Claims, 10 Drawing Sheets

Related U.S. Application Data (60) Provisional application No. 62/915,556, filed on Oct. 15, 2019.

(51) Int. Cl.
*H04L 12/437* (2006.01)
*H04L 12/46* (2006.01)
*H04W 84/18* (2009.01)
*H04L 12/40* (2006.01)

(56) References Cited

U.S. PATENT DOCUMENTS

| | | | | |
|---|---|---|---|---|
| 8,369,295 | B2* | 2/2013 | Thompson | H04W 36/385 370/338 |
| 8,904,181 | B1* | 12/2014 | Felsher | H04L 63/0442 713/171 |
| 9,031,565 | B2 | 5/2015 | Knefelkamp et al. | |
| 9,197,906 | B1 | 11/2015 | Kathol et al. | |
| 9,838,436 | B2 | 12/2017 | Michaels | |
| 9,986,036 | B2 | 5/2018 | Russo et al. | |
| 10,331,096 | B2 | 6/2019 | Pavaskar et al. | |
| 10,715,562 | B2* | 7/2020 | Robbins | H04L 67/28 |
| 10,785,699 | B2* | 9/2020 | Sirotkin | H04B 7/2606 |
| 2004/0251304 | A1* | 12/2004 | Carmon | G06K 17/0022 235/382 |
| 2007/0036092 | A1* | 2/2007 | Pang | H04L 12/4666 370/256 |
| 2008/0182573 | A1* | 7/2008 | Lauer | H04B 7/18506 455/431 |
| 2014/0259147 | A1* | 9/2014 | L'Heureux | H04L 63/02 726/14 |
| 2015/0003341 | A1* | 1/2015 | Claudel | H04W 12/08 370/329 |
| 2017/0078142 | A1* | 3/2017 | Montrichard | H04L 49/405 |
| 2017/0094535 | A1* | 3/2017 | Nuss | H04B 17/318 |
| 2018/0234706 | A1* | 8/2018 | Boussemart | H04L 12/2881 |
| 2019/0302715 | A1 | 10/2019 | Pavaskar et al. | |
| 2019/0306030 | A1* | 10/2019 | Chen | H04B 7/0413 |
| 2019/0385057 | A1* | 12/2019 | Litichever | H04L 63/1416 |
| 2020/0029209 | A1* | 1/2020 | Nolscher | H04W 12/069 |
| 2020/0389469 | A1* | 12/2020 | Litichever | H04L 12/4633 |
| 2021/0351987 | A1* | 11/2021 | Gomez | H04L 12/437 |

FOREIGN PATENT DOCUMENTS

| | | | | |
|---|---|---|---|---|
| EP | 3809669 | A1* | 4/2021 | H04L 12/437 |
| EP | 3809670 | A1* | 4/2021 | H04L 63/0209 |

OTHER PUBLICATIONS

Ian Moir et al: "Military Avionics Systems", Jan. 2006 (Jan. 1, 2006), pp. 47-97, XP055278208, ISBN: 978-0-470-01632-9Retrieved from the Internet: URL:https://www.wiley.com/en-us/Military+A vionics+Systems-o-9780470016329[retrieved on Jun. 6, 2016], p. 58-p. 77, figures 2.18,2.19,2.20,2.22, 2.23.

Search Report for European Application No. 20202103.6 dated Feb. 19, 2021, 8 pages.

Search Report for European Application No. 20202108.5 dated Mar. 12, 2021, 8 pages.

* cited by examiner

SMART POINT OF PRESENCE (SPOP) DEVICES FOR AIRCRAFT-BASED HIGH AVAILABILITY EDGE NETWORK ARCHITECTURE

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

Concurrently filed U.S. patent application Ser. No. 17/067,463 entitled SMART POINT OF PRESENCE (SPOP) AIRCRAFT-BASED HIGH AVAILABILITY EDGE NETWORK ARCHITECTURE and having internal docket number 124850US02; and U.S. Provisional Patent Application Ser. No. 62/915,556 entitled SMART POINT OF PRESENCE (SPOP) FOR AIRCRAFT-BASED HIGH AVAILABILITY EDGE NETWORK ADAPTATION, filed Oct. 15, 2019;

Said U.S. patent application Ser. No. 17/067,463 and 62/915,556 are herein incorporated by reference in their entirety.

TECHNICAL FIELD

Embodiments of the inventive concepts disclosed herein are directed generally to computer networking, and particularly to avionics networking configurations incorporating mission-critical subsystems.

BACKGROUND

Mission systems updates aboard aviation assets may require a long time to build, test, and certify. Current network architectures are optimized, with size, weight, and power (SWaP) considerations in mind, into interwoven "safe flight" and "mission success" systems. While it may be possible to separate architectures into independent, interactive air vehicle systems (AVS) and mission systems (MS) subsystems, the underlying "hub and spoke" network topologies require long wiring runs (doubly so in the case of duplex systems) which translates to increased wire weight, high rewiring costs, and high I/O density at the hubs, which complicate LRU designs and may require additional switches to extend the network topology.

Current interwoven architectures may require lengthy testing in order to achieve airworthiness certification. However, mission systems may be subject to far more rapid change and update cycles than air vehicle systems. While the emergence of autonomous systems may in turn require more redundant systems, legacy input/output (I/O) and power systems will persist as components of the solution space for the foreseeable future, as there is as yet no "one size fits all" I/O or power solution capable of supplanting them.

SUMMARY

A smart network access point (SNAP) device is disclosed. In embodiments, the SNAP device includes trunk ports for accepting a network trunk cable (e.g., fiber optic trunk) and thereby connecting the SNAP device to an aircraft-based network of SNAP devices. The SNAP device includes switch ports for incorporating physical connections to mission systems (MS) or air vehicle systems (AVS) components and devices, providing a local smart point of presence (SPoP) throughout a physical subdivision (e.g., network district) of an aircraft. The SNAP device is configured for monitoring data exchanges between local MS/AVS components and the aircraft network. The SNAP device includes a cybersecurity module for connecting to local security components (e.g., data guards and multiple levels of security (MLS) encryption/decryption) or for providing built-in data guard and encryption/decryption services. The SNAP device includes power control components for managing power distribution to the connected local network components.

In some embodiments, the SNAP device power control components are selected from a power converter connected to an aircraft power supply (e.g., and configured for converting the aircraft power to a lower voltage compatible with the local network components), electronic circuit breakers (ECB) for supplying the converted power to the local network components, and batteries for providing a local power source to district network components and devices.

In some embodiments, the SNAP device includes a time management module for synchronizing local network components and devices to the aircraft network.

In some embodiments, the SNAP device includes bridging ports for accommodating a guarded network bridge and thereby securely connecting the SNAP device to a second SNAP device of another aircraft-based network (e.g., a mission systems (MS) and air vehicle systems (AVS) network.

In some embodiments, the local network components or devices within the network district include legacy components compatible with wired interfaces and connected to the aircraft network (e.g., a fiber optic based MS or AVS network) via an adaptive input/output (I/O) module configured for providing data exchanges between the aircraft network and the legacy components.

In some embodiments, the legacy components are compatible with, and connected via, MIL-STD-1553 serial data buses, ARINC 429 avionics data buses, or Ethernet cables and networking components.

In some embodiments, the adaptive I/O module includes multiple levels of security (MLS) encryption and decryption modules and cross-domain guards for secure data exchanges to and from local network components or devices.

In some embodiments, the SNAP device includes data concentrator units (DCU).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Embodiments of the inventive concepts disclosed herein are directed to a network architecture based on localized smart points of presence (SPoP) and incorporating autonomous, interconnected air vehicle systems (AVS) and mission systems (MS) communications networks which are distinctly separable and protected while remaining highly interactive with each other through a "digital backbone". While in the short term the AVS network, which is associated with a lower change velocity, may remain a traditional hub-and-spoke (e.g., point-to-point, star-topology) network with a high-speed, high-bandwidth network trunk, the MS network (which has a much higher change velocity) may adopting ring or mesh topologies to increase reliability, survivability, availability, and alleviate the need for long wiring runs. In some embodiments, the AVS network may additionally adopt ring/mesh topologies. The MS and AVS network trunks may incorporate copper or other cabling (e.g., to accommodate legacy I/O or power components); alternatively, the network trunks may be fiber optic based.

Figure 1:
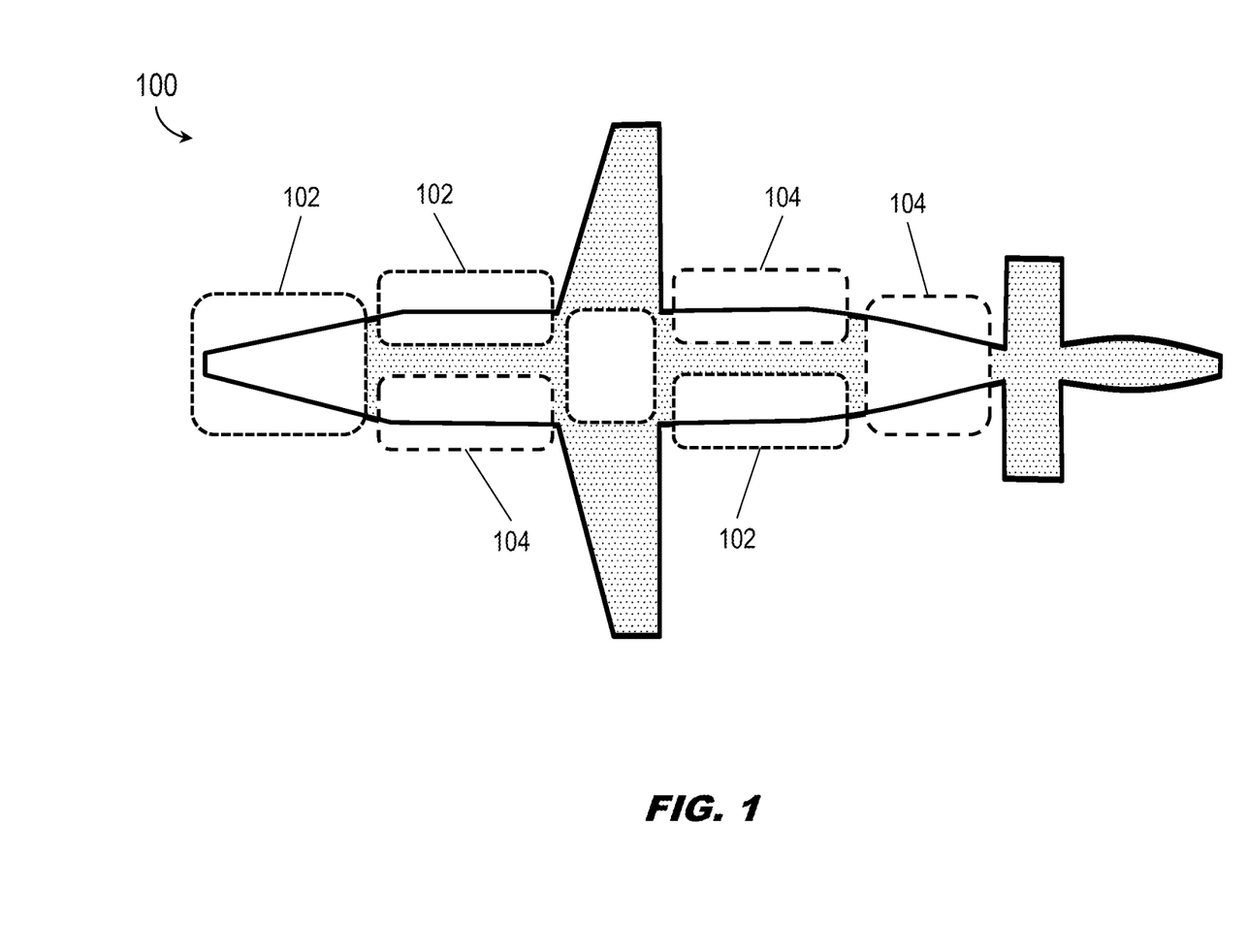
FIG. 1 is a diagrammatic illustration illustrating a networked aircraft, in accordance with example embodiments of this disclosure.
Figure 2:
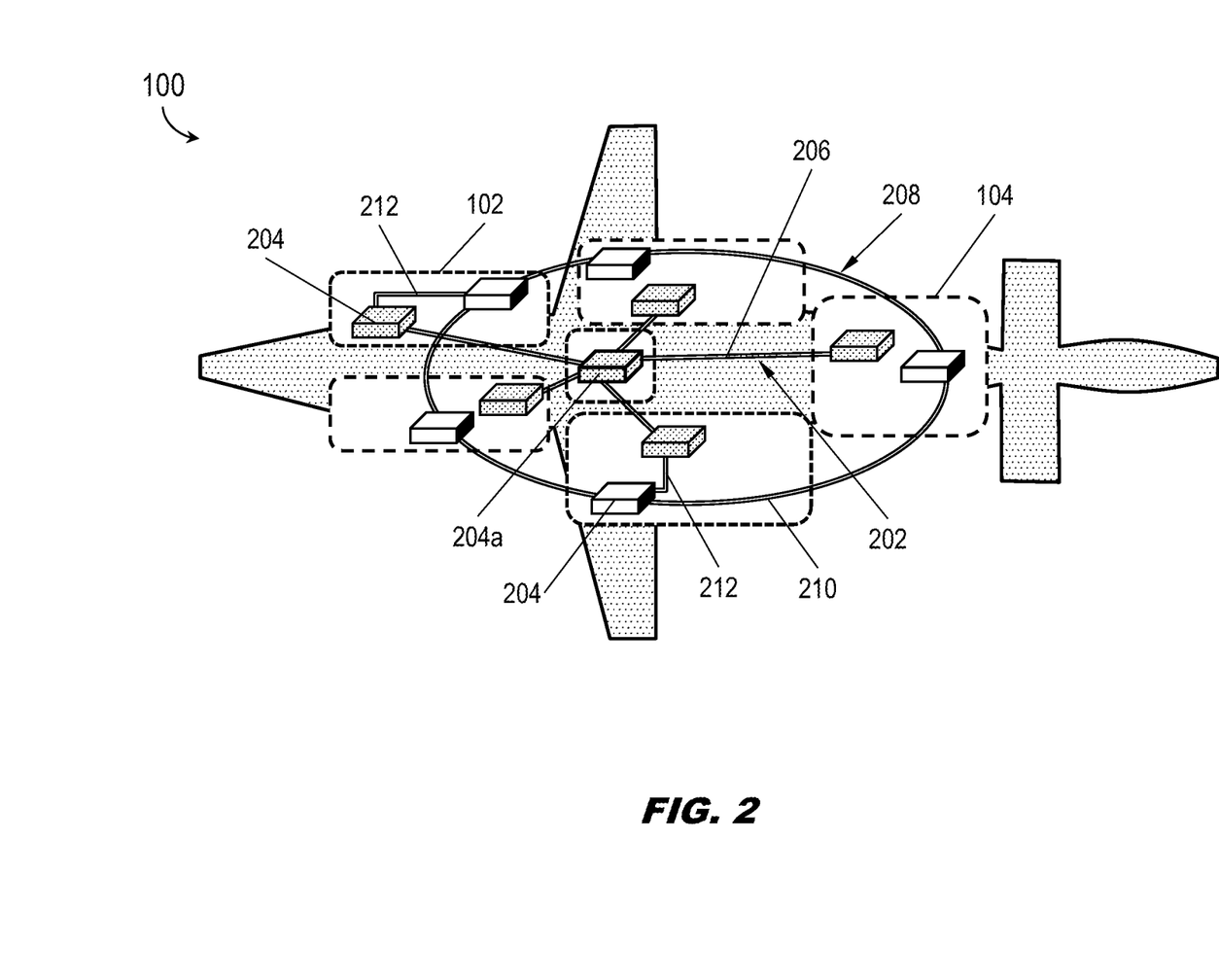
FIG. 2 is a diagrammatic illustration illustrating air vehicle systems (AVS) and mission systems (MS) networks of the aircraft of FIG. 1.

Referring to FIGS. 1 and 2, the aircraft 100 is shown. The aircraft 100 may include, but is not limited to, fixed-wing craft, rotorcraft, or unmanned aircraft systems (UAS) piloted by one or more remote operators, or capable of partially or fully autonomous operation.

In embodiments, the aircraft 100 may be compartmentalized and/or categorized into districts, each district corresponding to a physical subdivision of the aircraft and incorporating any and all network components physically located within the said district. Each district may include one or more district service access points (DSAP) through which any network components within the district may be connected to, and may exchange data with, an MS or AVS network.

In embodiments, the aircraft 100 may be broken down into essential districts 102 and non-essential districts 104. Essential districts 102 may include AVS essential districts and MS essential districts; AVS essential districts may support equipment and/or services directed to aviation functions, while MS essential (and non-essential) districts may support mission-related equipment and/or services. For example, AVS network components or services may include, but are not limited to, flight control and/or air vehicle computers, human/machine interfaces (HMI), autonomous command and control (C2) and payload systems, communications antennas and tuners, standby instrumentation, landing gear and lighting control systems, vehicle management sensors (e.g., engine, transmission, fuel), and onboard navigational instruments (e.g., radar altimeter (radalt), VOR/ILS, air data computers (ADC), embedded GPS/inertial (EGI) positioning systems). MS network components and services may include, but are not limited to, mission computers and/or display systems (e.g., including DVE processing systems and/or 3D sensors), flight/mission data recorders, weather sensors and/or receivers, head-mounted display (HMD) systems and head trackers, weapons and targeting systems, survivability components and countermeasures, and tactical communications systems (e.g., LOS/BLOS radio systems, SATCOM radio systems, tactical data links). "Essential" equipment or services may refer to any mission-critical network component incorporating dual redundancies (e.g., to avoid a single point of failure and ensure high availability) and/or any network component operating or operable on local battery power (as described in greater detail below). Similarly, non-essential network components include any network components that are not essential, e.g., without which mission objectives may be fulfilled via alternative means.

In embodiments, essential districts 102 may include both essential and non-essential components, while non-essential districts 104 support solely non-essential components. Referring in particular to FIG. 2, the aircraft 100 may incorporate an AVS network 202 having a star topology (e.g., hub-and-spoke) comprising a number of smart network access point (SNAP) devices 204, each SNAP device connected to a central/hub SNAP device 204a via AVS network trunk 206 (e.g., fiber optic, copper/wired or cable connection) and serving as a DSAP for any AVS network components or devices within its district. Similarly, the aircraft 100 may incorporate an MS network 208 comprising a group of SNAP devices 204 connected in a ring topology via an MS network trunk 210 (e.g., fiber optic trunk cable). For example, the AVS network 202 and MS network 208 may be independent and isolated from each other but directly connected via one or more network bridges 212 (e.g., dual redundant guard/network bridge). In embodiments, each district (essential districts 102 and non-essential districts 104) may include at least one SNAP device 204, e.g., at least one AVS SNAP device of the AVS network 202 and at least one MS SNAP device of the MS network 208. For example, some districts may include multiple SNAP devices, e.g., if the quantity of network components and/or devices within its district so requires.

By moving hub-and-spoke connections of the AVS network 202 to the district level, the length (and weight) of cabling or wiring may be minimized while maintaining high availability. Similarly, a next-generation or high change velocity MS network 208 may be retrofitted to an existing hub-and-spoke AVS network 202, allowing for high flexibility of functionality by supporting the addition of new SNAP devices 204 between existing MS SNAP devices in an MS network having a ring topology (e.g., or a mesh topology). Further, SNAP devices 204 may provide conversion support for legacy I/O and/or power components at the district level, compartmentalizing I/O and power needs within a district and providing for easier portability of features from one SNAP device to another. The replacement of legacy I/O and power components may be incentivized by the removability of conversion support features when they are no longer needed, further improving SWaP considerations. At a high level, rapid change and deployment of new MS features may be provided while preserving certified airworthy AVS features, eliminating the need for additional recertification testing.

Figure 3:
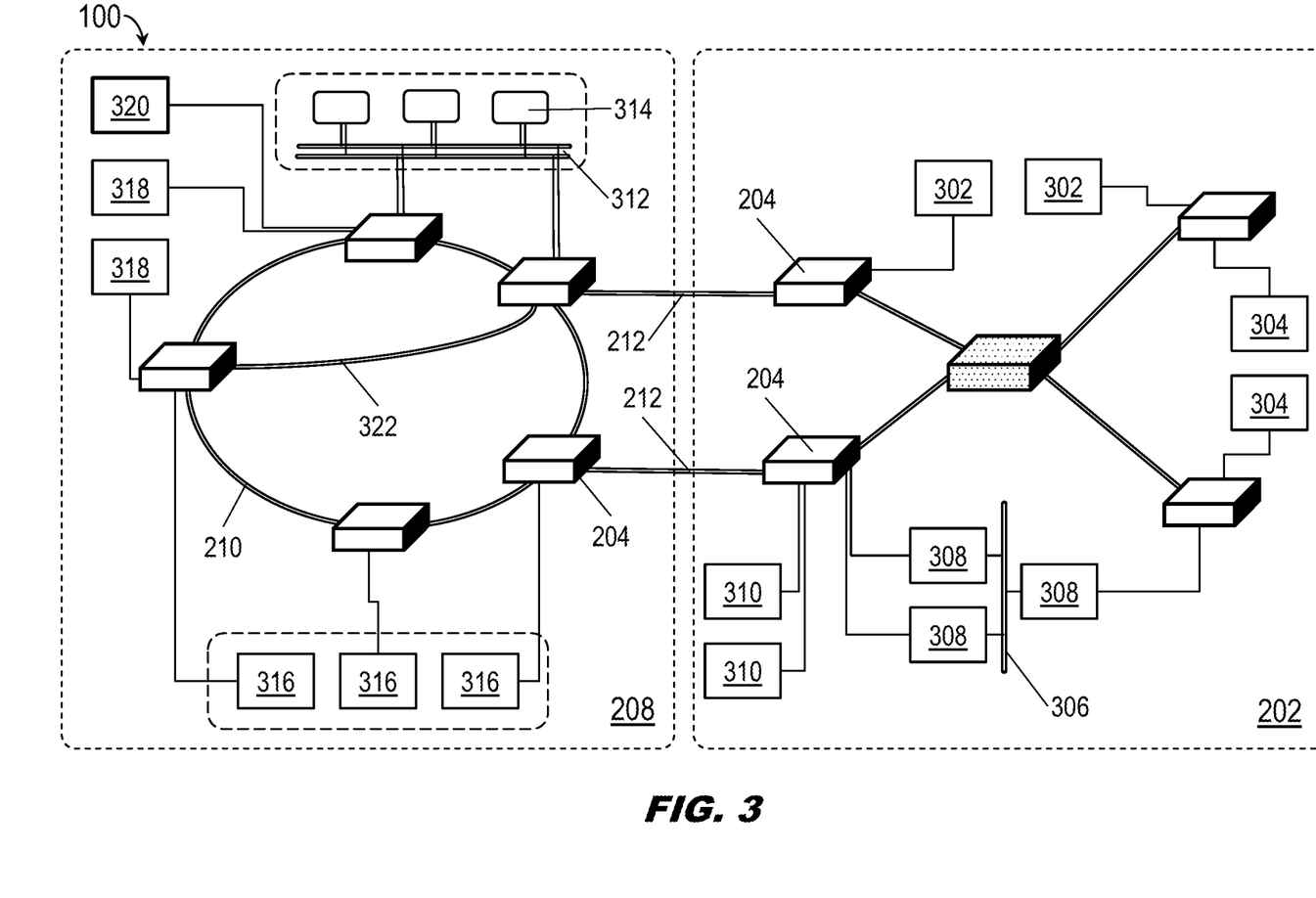
FIG. 3 is a diagrammatic illustration illustrating components of the AVS and MS networks of the aircraft of FIG. 1.

Referring to FIG. 3, the aircraft 100, AVS network 202, and MS network 208 are disclosed.

In embodiments, the AVS network 202 and MS network 208 may be connected via high bandwidth network bridges 212 (e.g., dual redundant network trunks) protected on each end by SNAP devices 204 and including assured network guards. For example, the network bridges 212 may further provide a "digital backbone" for additional shared functionalities (e.g., adaptive cooling/thermal management for dissipation or control of heat generated by components within a district) between the AVS and MS networks.

In embodiments, each SNAP device 204 may serve as a district service access point (DSAP) for network components in its district. For example, the SNAP devices 204 of the AVS network 202 may provide network access to, e.g., communications equipment 302, navigational sensors 304, ARINC 429 data buses 306 and compatible legacy equipment 308, and AVS displays 310. Similarly, the SNAP devices 204 of the MS network 208 may provide network access to, e.g., MIL-STD-1553 data buses 312 and compatible legacy equipment 314; sensor suites 316; MS displays 318; and mission computers 320. In some embodiments, the MS network 208 may be configured in a mesh topology rather than the ring topology shown by, e.g., FIG. 2, whereby some SNAP devices 204 are directly connected (322) in addition to their ring neighbors on the MS network trunk 210. In embodiments, the SNAP devices 204 may provide district-level management for, e.g., power distribution and control; thermal management and adaptive cooling (e.g., management of heat generated by the network components within a district); network access; I/O conversion and distribution; and encryption/decryption. For example, a SNAP device 204 may incorporate additional software and/or hardware components depending on the DSAP services provided within its district, as described in greater detail below.

Figure 4:
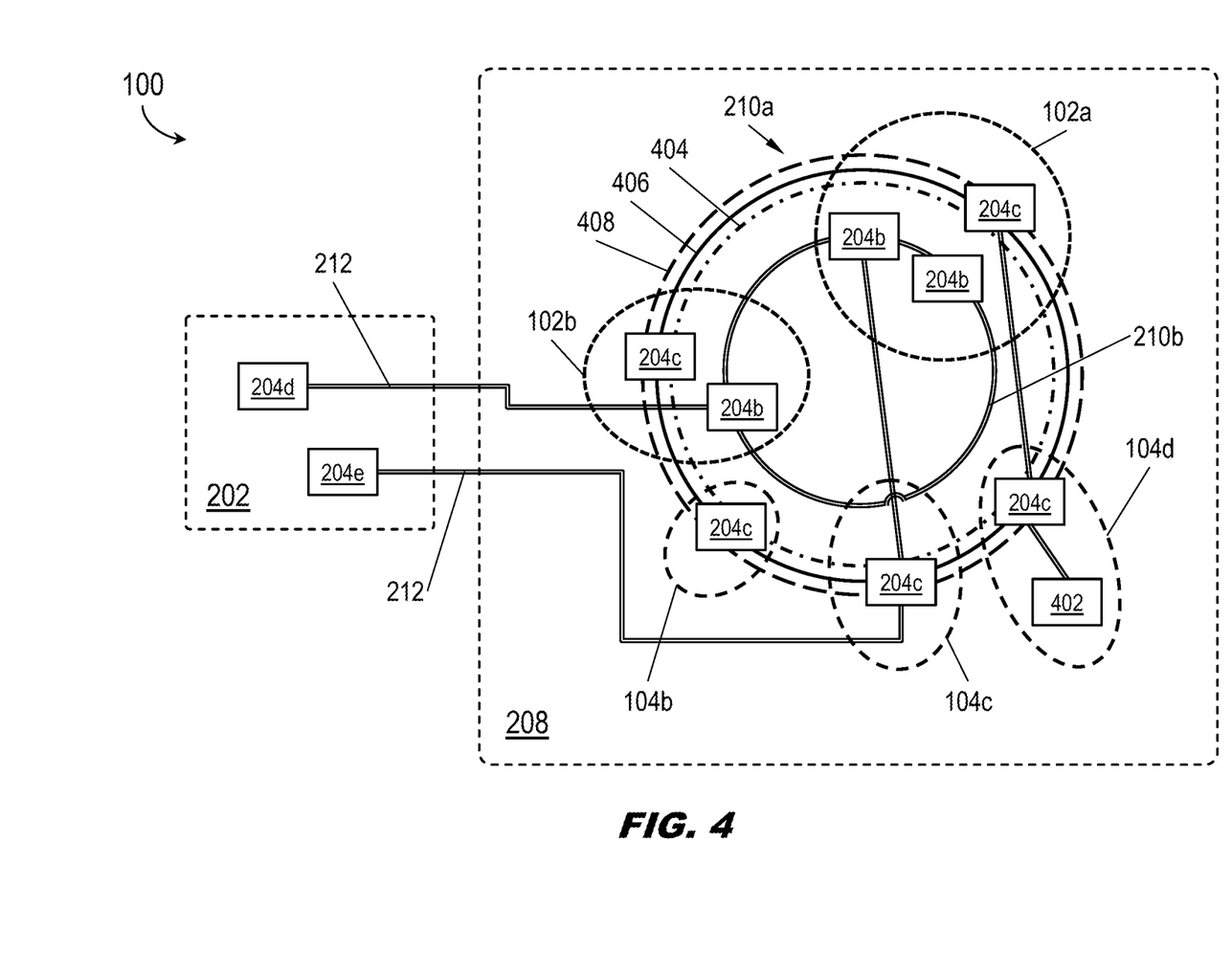
FIG. 4 is a diagrammatic illustration of components of the MS network of FIG. 3.

Referring to FIG. 4, the aircraft 100, AVS network 202, and MS network 208 is disclosed.

In embodiments, the MS network 208 (as well as the AVS network 202, not shown here in equivalent detail) may comprise multiple local area networks, connected via MS network trunks 210a-b, for its essential districts 102 and non-essential districts 104. For example, the essential district 102a may include both essential and non-essential network components, serviced by essential SNAP devices 204b and non-essential SNAP device 204c. Similarly, the essential district 102b may include essential SNAP device 204b (with network bridging (212) to AVS SNAP device 204d) and non-essential SNAP device 204c. The non-essential districts 104b-c may each include non-essential SNAP devices 204c (the latter SNAP device of the non-essential district 104c also incorporating network bridging 212 to AVS SNAP device 204e), and the non-essential district 104d may include non-essential SNAP device 204c, which may serve as a subnetwork hub for the subnetwork 402.

In embodiments, each MS network trunk 210a-b connecting a local area network within the MS network 208 may incorporate backbone rings 404, 406, 408. For example, a data ring 404 may provide primary control and data functionality for the MS network 208. A dedicated video/sensor ring 406 may provide high-bandwidth raw video (e.g., main cameras/heads-up displays, weather radar, fire control, forward-looking infrared radar (FLIR)). A time ring 408 may provide accurate and time-sensitive distribution of precise timing synchronization information throughout the MS network 208 and, through the SNAP devices 204b-e, to network components and devices served by the SNAP devices.

Figure 5:
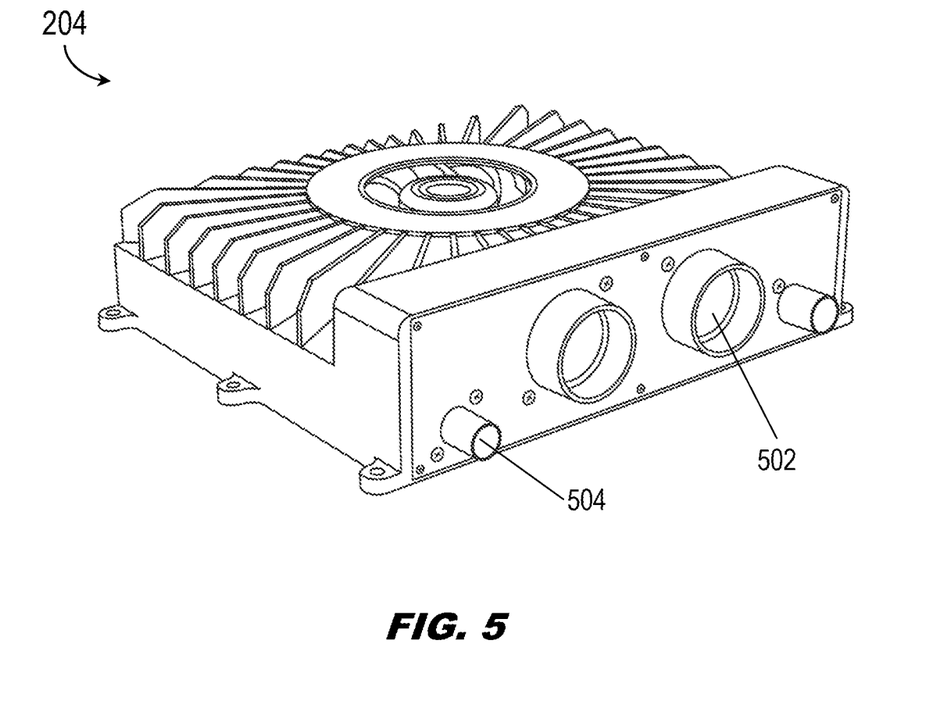
FIG. 5 is an isometric view of a smart network access point (SNAP) device of the AVS and MS networks of FIGS. 1 through 3.

Referring now to FIG. 5, the SNAP device 204 is disclosed.

In embodiments, the SNAP device 204 may include network trunk ports 502 capable of accepting network trunk connections (e.g., AVS network trunk (FIG. 2, 206), MS network trunk (FIG. 2, 210) for incorporation into an AVS network (FIG. 2, 202) or MS network (FIG. 2, 208). The SNAP device 204 may include additional device ports 504 for accepting physical links (e.g., coaxial, fiber, copper) to AVS or MS network components or devices within a district served by the SNAP device.

In embodiments, each SNAP device 204 may be capable of controlling multiple standard functions, e.g., cybersecurity, trunk networking, power control and distribution, district networking, and adaptive cooling/thermal management. In some embodiments, a SNAP device 204 may be required to manage additional functionalities, e.g., power transformation, district-level data concentration, and/or district-level isolated power distribution Referring also to FIG. 6, an adaptive I/O access point device 600 (AIAP, AdAPt) is disclosed. In embodiments, the SNAP device 204 may incorporate an AIAP device 600 in order to provide network access to, and data exchange with, a fiber optic MS network (FIG. 2, 208) or AVS network (FIG. 2, 202) and legacy network components or equipment via device ports 602, e.g., legacy equipment (FIG. 3: 308, 314) compatible with MIL-STD-1553 and/or ARINC 429 data buses (FIG. 3: 306, 312) or, e.g., discrete or serial interfaces. In some embodiments, the AIAP device 600 may incorporate additional components, e.g., for data guard and/or encryption/decryption capabilities, as described in greater detail below.

Figure 7A:
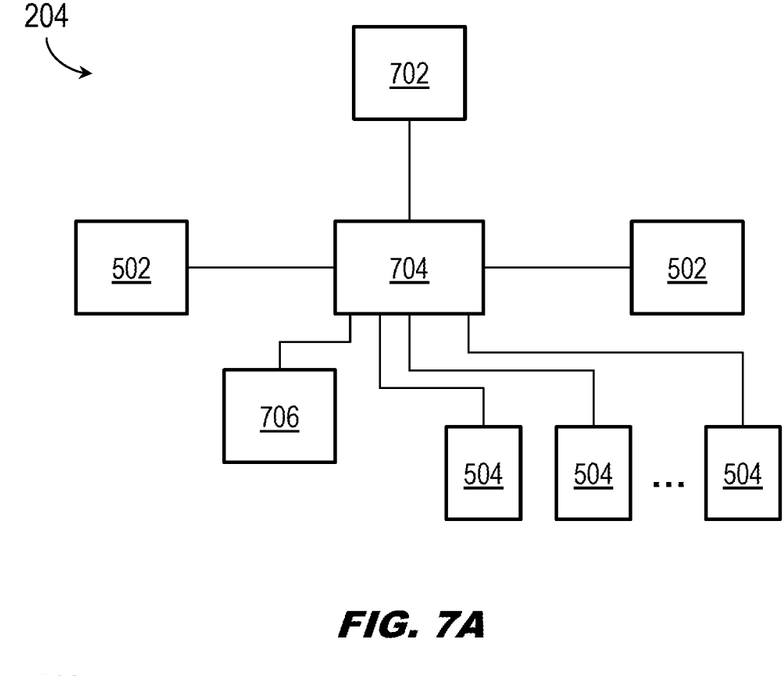
FIGS. 7A and 7B are block diagrams of components of the SNAP device of FIG. 5.
Figure 7B:
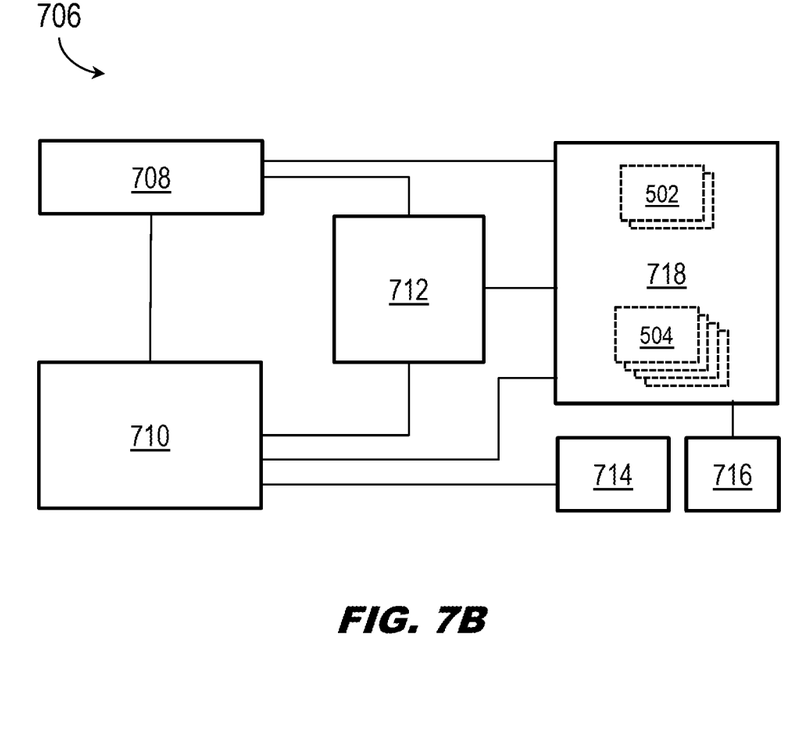

Referring to FIGS. 7A and 7B, the SNAP device 204 is disclosed.

Referring in particular to FIG. 7A, the SNAP device 204 may include, in addition to network trunk ports 502 and device ports 504 (e.g., district switch ports), network bridging ports 702 for accepting network bridging (FIG. 2, 212), e.g., to an AVS network (FIG. 2, 202) if the SNAP device 204 is part of an MS network (FIG. 2, 208), or to the MS network if the SNAP device is part of the AVS network.

In embodiments, the SNAP device 204 may include a ring switch 704 and network processors 706 for handling data exchanges and component management within the district served by the SNAP device. Referring also to FIG. 7B, the network processors 706 may include time management modules 708 (e.g., capable of sending or receiving timing information via the time ring (FIG. 4, 408)), device/network management modules 710, cybersecurity management modules 712, power management modules 714, and network endpoints 716. The bridge core 718 may connect the network processors 706 to the network trunk ports 502 and device ports 504. It is contemplated that the SNAP device 204 may support a 10 Gb MS network 208 with a growth path to 100 Gb.

Figure 6:
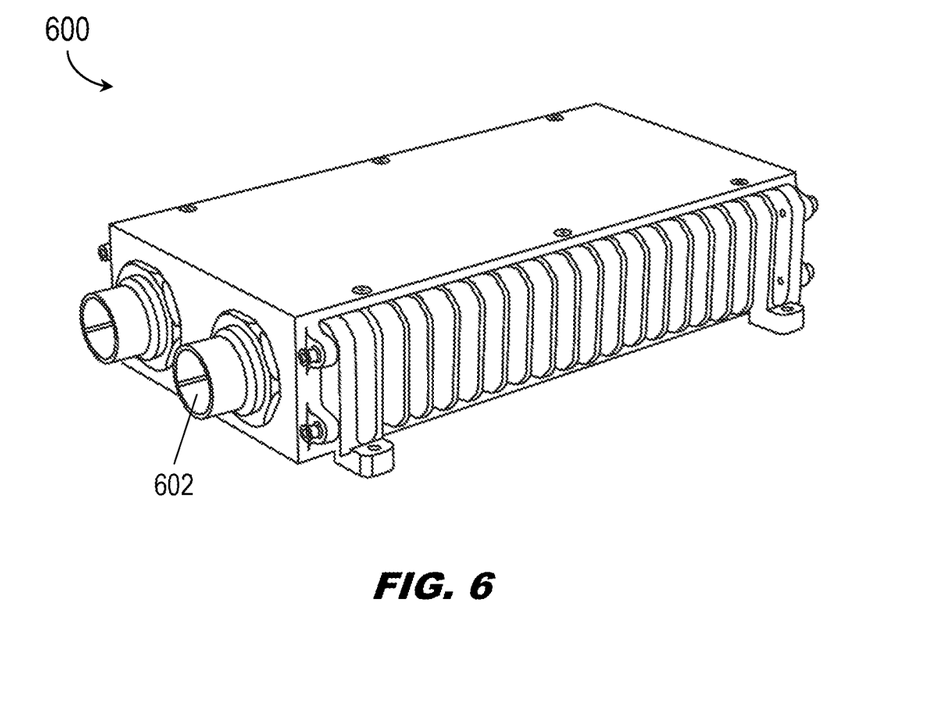
FIG. 6 is an isometric view of an adaptive I/O access point (AIAP) device of the AVS and MS networks of FIGS. 1 through 3.
Figure 7C:
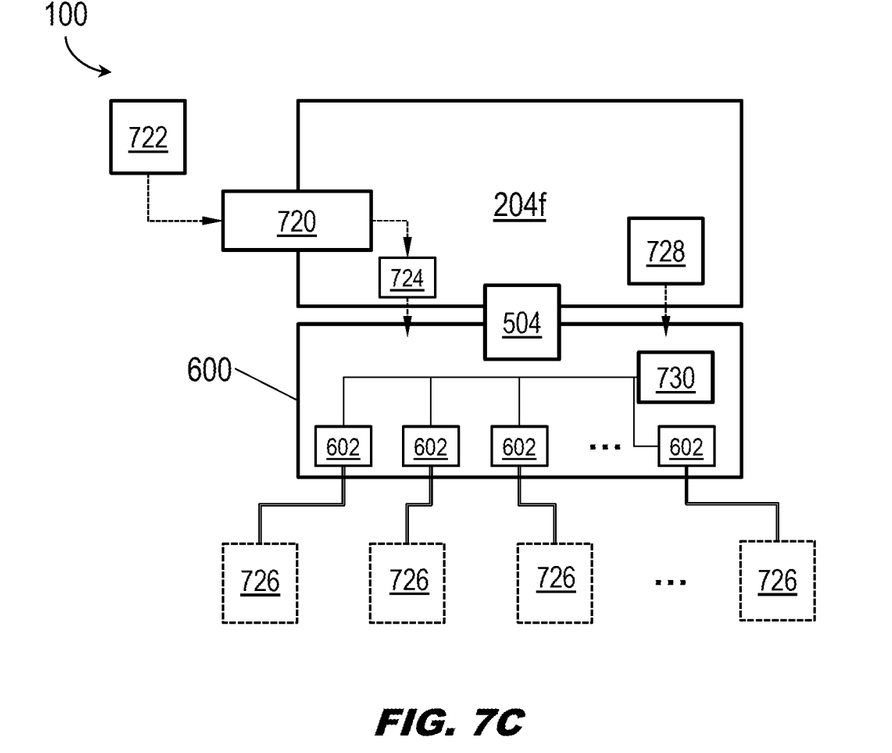
FIG. 7C is a block diagram of components of the SNAP device of FIG. 5 and the AIAP device of FIG. 6.

Referring also to FIG. 7C, the SNAP device 204f may be implemented and may function similarly to the SNAP devices 204, 204a-e of FIGS. 1 through 7B, except that the SNAP device 204f may incorporate an AIAP device 600 via a device port 504.

In embodiments, the SNAP device 204f may (e.g., via power management modules (FIG. 7B, 714)) control the distribution of operating power to network components and devices within its district. For example, the SNAP device 204f may incorporate power converters 720 capable of receiving operating power from an aircraft power supply 722 and, via electronic circuit breakers 724 (ECB), supplying operating power to the AIAP device 600 and/or legacy network components and devices (726) served by the SNAP device 204f via the AIAP device. For example, the power converters 720 may convert received 270V operating power to 28V for distribution to the network components and devices. In some embodiments, the SNAP device 204f may control the distribution of operating power through a local battery 728.

Figure 7D:
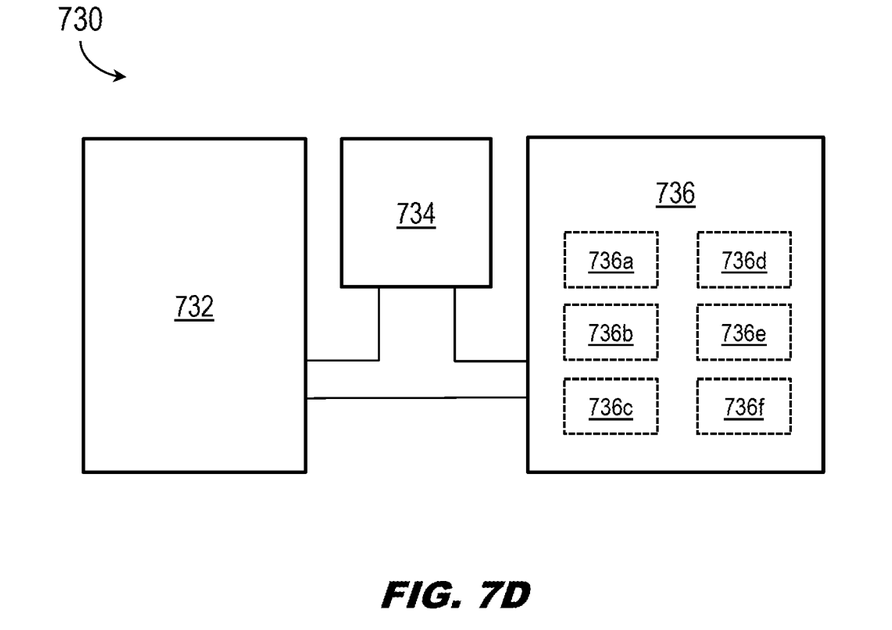
FIG. 7D is a block diagram of components of the AIAP device of FIG. 6.

In embodiments, additional functionalities provided by the AIAP device 600 (e.g., to legacy network components and devices via AIAP device ports 602) may be managed by local processors 730. Referring also to FIG. 7D, in embodiments, the AIAP local processors 730 may incorporate AIAP device and I/O management modules 732, cybersecurity management modules 734, and an edge I/O core 736 for control of, e.g., general computing 736a, data guarding 736b, data relay and routing 736c, data transformation 736d (e.g., between copper/wired and fiber-optic components), data encryption/decryption 736e, and network endpoint services 736f.

Figure 8A:
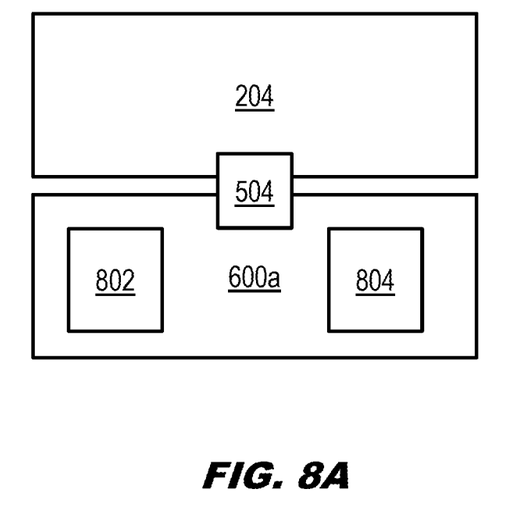
FIGS. 8A and 8B are block diagrams of components of the SNAP device of FIG. 5 and the AIAP device of FIG. 6.

Referring to FIG. 8A, the AIAP device 600a may be implemented and may function similarly to the AIAP device 600 of FIGS. 6 through 7D, except that the AIAP device 600a appended to the SNAP device 204 (e.g., via device port 504) may incorporate a district-level data concentrator unit 802 (DCU) and/or district-level Ethernet switch 804 (e.g., to provide network access for Ethernet network components to a fiber-optic MS network (FIG. 2, 208).

Figure 8B:
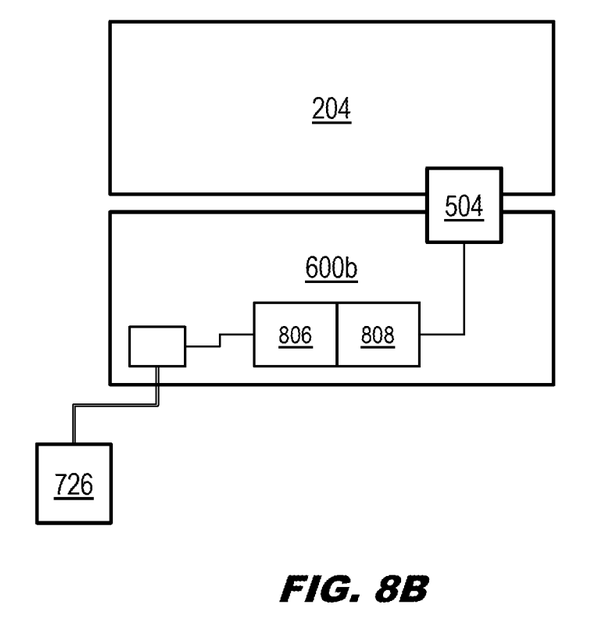

In some embodiments, the SNAP device 204 and AIAP device 600a may connect to existing cross-domain guard and/or Multiple Levels of Security (MLS) encryption/decryption equipment to provide added cybersecurity for district-level legacy network components and devices having security classifications different than the MS network 208. Referring to FIG. 8B, the AIAP device 600b may be implemented and may function similarly to the AIAP devices 600, 600a of FIGS. 6 through 8A, except that the AIAP device 600b may incorporate cross-domain guard functionality 806 and MLS encryption/decryption 808 (e.g., via AIAP cybersecurity management modules (FIG. 7D, 732)) for providing cybersecurity and data guard services incorporating multiple levels of assurance to legacy network components and devices (726).

Figure 9:
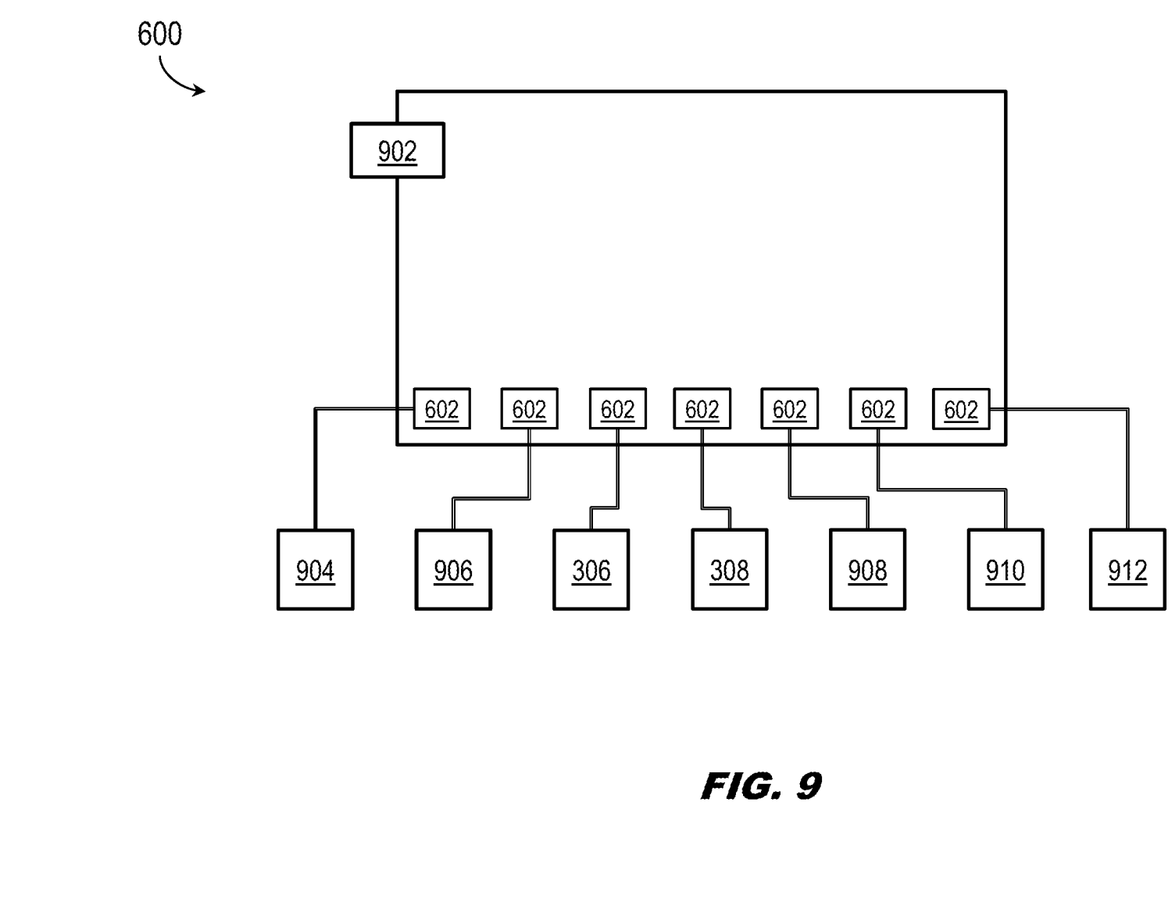
FIG. 9 is a block diagram of components and operations of the AIAP device of FIG. 6.

Referring to FIG. 9, the AIAP device 600 is disclosed.

In embodiments, the AIAP device 600 may provide signal conditioning, MLS data guarding, and/or encryption and decryption of data exchanged between legacy components and devices (e.g., connected via AIAP device ports 602) and the MS network (FIG. 2, 208), e.g., USB-connected components (902); Ethernet links and/or networking components (904); Avionics Full-Duplex Switched Ethernet (AFDX) and other like ARINC 664-compatible components (906); MIL-STD-1553 data buses (308); ARINC 429 data buses (306); serial connections and/or components (908; e.g., RS-232, RS-422, RS-485); analog network components (910); and discrete-port connected components (912).

For example, as described above if the AIAP device incorporates MLS encryption/decryption (FIG. 8B, 808) and/or cross-domain guarding (FIG. 8B, 806) as described above. Further, the AIAP device 600 may provide data relay and routing, multiplexing (muxing) and demultiplexing (demuxing) and transformation of exchanged data between network components (e.g., copper-to-fiber, fiber-to-copper, fiber-to-fiber, copper-to-copper).

Figure 10:
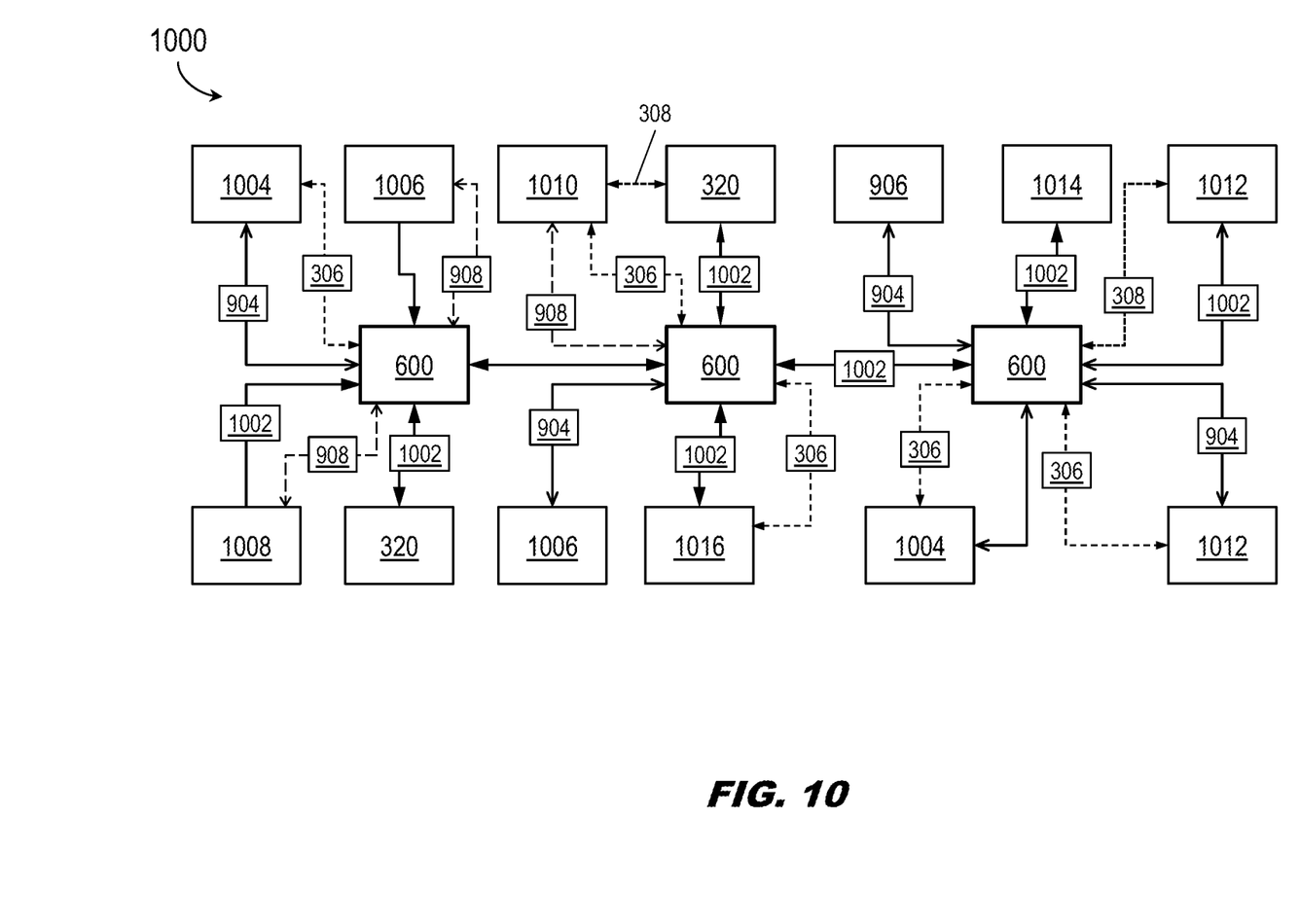
FIG. 10 is a block diagram of an implementation of the AIAP device of FIG. 6.

Referring to FIG. 10, an AIAP backplane implementation 1000 is disclosed. The AIAP backplane implementation 1000 may include multiple AIAP devices 600.

In embodiments, the AIAP backplane implementation 1000 may provide access to the MS network (FIG. 2, 208) via the AIAP devices 600 to fiber-optic and legacy network components and devices, e.g., via fiber-optic connections 1002 or legacy wired connections (including, but not limited to, Ethernet links and/or cables 904; serial connections 908; ARINC 429 data buses 306; and MIL-STD-1553 data buses 308). Connected network component and devices may include, but are not limited to, mission computers 320; sensor suites (FIG. 3, 316; e.g., flight sensor suites 1004, mission sensors 1006, cameras/image sensors 1008); input devices 1010; AFDX and other Ethernet switches 906; flight computers 1012; display systems (e.g., flight crew displays 1014, mission displays 1016).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A smart network access point (SNAP) device, comprising:
    two or more trunk ports configured to accept a network trunk cable, the SNAP device connectible to an aircraft network via the network trunk cable;
    a plurality of switch ports, each switch port configured to accept a physical link to one or more district components disposed within a district associated with a physical subdivision of an aircraft wherein the one or more district components include one or more legacy components coupled to the SNAP device via a wired interface;
    at least one bridging port configured to accept a network bridging cable, the SNAP device configured for connecting a first aircraft network to a second aircraft network via the network bridging cable, wherein the aircraft network is the first aircraft network, is different than the second aircraft network, and is a wired network, wherein the second aircraft network is a wired network;
    and
    one or more control processors including:
        a network management configured for monitoring one or more exchanges of data between the one or more district components and the aircraft network;
        a cybersecurity management configured for encryption and decryption of the exchanged data;
        and
        a power management configured for controlling the distribution of operating power to the one or more district components; at least one adaptive input/output (I/O) management configured for monitoring the one or more exchanges of data between the one or more legacy components and the aircraft network;
        and
    wherein the at least one adaptive I/O management includes:
        at least one multiple levels of security (MLS) encryption/decryption management configured to encrypt and decrypt the one or more data exchanges; and
        at least one cross-domain guard.

2. The SNAP device of claim 1, wherein the power management includes one or more power control components selected from:
    a power converter operatively coupled to a power supply of the aircraft;
    an electronic circuit breaker (ECB) configured to supply converted power to the one or more district components;
    and
    a local battery configured to supply operating power to the one or more district components.

3. The SNAP device of claim 1, further comprising:
    at least one time management configured for time synchronization of the one or more control processors and the one or more district components to the aircraft network.

4. The SNAP device of claim 1 above, wherein the wired interface includes at least one of:
    a serial data bus according to MIL-STD-1553;
    an avionics data bus according to ARINC 429;
    or
    an Ethernet networking component.

5. The SNAP device of claim 1, wherein the network management includes at least one data concentrator unit (DCU).

6. The SNAP device of claim 1, wherein:
    the district is an essential district;
    and
    the one or more district components include at least one mission-critical district component.

7. The SNAP device of claim 1, wherein:
    the first aircraft network is associated with at least one of a ring topology or a mesh topology.

* * * * *